(12) United States Patent
Nagao et al.

(10) Patent No.: US 8,505,664 B2
(45) Date of Patent: Aug. 13, 2013

(54) SNOWMOBILE

(75) Inventors: Tokinari Nagao, Shizuoka (JP); Atsushi Sawabuchi, Shizuoka (JP); Takashi Ashida, Shizuoka (JP); Kazuhiro Ishizawa, Shizuoka (JP); Takayuki Yamada, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 2 days.

(21) Appl. No.: 13/585,872

(22) Filed: Aug. 15, 2012

(65) Prior Publication Data

US 2012/0305324 A1   Dec. 6, 2012

Related U.S. Application Data

(63) Continuation of application No. 12/911,559, filed on Oct. 25, 2010, now Pat. No. 8,276,700.

(30) Foreign Application Priority Data

Oct. 26, 2009  (JP) ................................. 2009-245096

(51) Int. Cl.
  *B62M 29/00*  (2006.01)
(52) U.S. Cl.
  USPC ........................................................ 180/190

(58) Field of Classification Search
  USPC ............................ 180/190, 68.3; 123/339.14
  See application file for complete search history.

(56) References Cited

U.S. PATENT DOCUMENTS

| | | | | |
|---|---|---|---|---|
| 7,134,520 B2* | 11/2006 | Yatagai et al. | ................ | 180/190 |
| 7,832,519 B2* | 11/2010 | Sakamoto et al. | ............ | 180/312 |
| 2004/0188161 A1* | 9/2004 | Yatagai et al. | ................ | 180/190 |
| 2004/0237927 A1* | 12/2004 | Morii et al. | ................ | 123/193.5 |
| 2005/0014583 A1* | 1/2005 | Morii et al. | ..................... | 474/14 |
| 2006/0243247 A1* | 11/2006 | Yokoi | ............. | 123/399 |
| 2009/0071437 A1* | 3/2009 | Samoto et al. | ................ | 123/399 |
| 2009/0171546 A1* | 7/2009 | Tozuka et al. | .................. | 701/93 |

OTHER PUBLICATIONS

Nagao et al.; "Snowmobile"; U.S. Appl. No. 12/911,559, filed Oct. 25, 2010.

* cited by examiner

*Primary Examiner* — Tashiana Adams
(74) *Attorney, Agent, or Firm* — Keating & Bennett, LLP

(57) ABSTRACT

A snowmobile includes a throttle motor that is protected from brake dust. The snowmobile includes a snowmobile body including an engine room therein, an engine disposed inside the engine room, brake equipment disposed inside the engine room, a throttle valve arranged to adjust intake air supplied to the engine, and a throttle motor which is disposed at a more forward position than the brake equipment inside the engine room and arranged to drive the throttle valve.

10 Claims, 7 Drawing Sheets

SNOWMOBILE

BACKGROUND OF THE INVENTION

1. Field of the Invention

The present invention relates to snowmobiles, and more specifically, to a snowmobile which includes a throttle motor and brake equipment both housed inside an engine room.

2. Description of the Related Art

Conventionally, motorcycles and automobiles may have electronic throttles. In such a vehicle, brake equipment is disposed closely to the wheels. Since the throttle motor and the brake equipment are disposed at a distance from each other, there is no risk that brake dust will contaminate the throttle motor.

However, if an electronic throttle is to be incorporated in a snowmobile, a throttle motor and brake equipment are both disposed in an engine room. The inventor of the present invention became aware that such an arrangement has a risk that brake dust will contaminate the throttle motor.

For, example, JP-A H7-125679 discloses a snowmobile, in which air intake equipment, a driven shaft for transmitting power from an engine, and brake equipment are disposed behind the engine. The brake equipment includes a brake disc which is fixed to the driven shaft, and a brake caliper. When the brake is applied, the brake caliper firmly presses the brake disc from both sides. If an electronic throttle is to be incorporated in such a snowmobile, both the throttle motor and the brake equipment will be housed inside the engine room, which means the throttle motor is disposed relatively closely to the brake equipment. This poses the risk that brake dust which comes from the brake equipment will undesirably affect the throttle motor.

SUMMARY OF THE INVENTION

Therefore, preferred embodiments of the present invention provide a snowmobile in which a throttle motor is protected from brake dust.

According to a preferred embodiment of the present invention, a snowmobile includes a snowmobile body including an engine room therein; an engine disposed inside the engine room; brake equipment disposed inside the engine room; a throttle valve arranged to adjust intake air supplied to the engine; and a throttle motor disposed at a more forward position than the brake equipment inside the engine room and arranged to drive the throttle valve.

According to a preferred embodiment of the present invention, the throttle motor is disposed at a more forward position than the brake equipment in the engine room, so the throttle motor is located more upstream of wind than the brake equipment. In this case, as the vehicle moves, the wind reduces and minimizes an amount of brake dust of the brake equipment which reaches the throttle motor. Thus, the arrangement protects the throttle motor from the brake dust and prevents contamination of the throttle motor from the brake dust.

Preferably, the snowmobile further includes air-intake equipment which includes the throttle motor and a throttle body arranged to house the throttle valve. With this arrangement, the throttle body includes therein an air passage for the intake air to flow to the engine, and the air-intake equipment is disposed ahead of the engine. In this case, the arrangement also protects other components of the air-intake equipment from the brake dust since the air-intake equipment which includes the throttle motor is disposed ahead of the engine.

Further preferably, the brake equipment is located at a more rearward position than a cylinder axis of the engine in a side view, and the throttle motor is located at a more forward position than the cylinder axis in a side view. In this case, the throttle motor and the brake equipment are separated from each other by the engine. This reduces and minimizes brake dust which reaches the throttle motor.

Further, preferably, the engine includes a plurality of cylinders disposed side by side in a direction of width of the snowmobile. In this case, the engine has a relatively large dimension in the vehicle's width direction. This reduces and minimizes brake dust which flies around the engine and reaches the throttle motor from the vehicle's width direction.

Preferably, at least a portion of the throttle motor is at a higher position than the brake equipment. In this case, gravity reduces and minimizes brake dust which reaches the throttle motor.

Further preferably, the cylinder axis is slanted so that an upper portion thereof is located at a more rearward position than a lower portion thereof. In this case, the throttle motor disposed ahead of the engine is in an upper region with respect to the cylinder axis as a division line. Therefore, it is easy to place the throttle motor at a relatively high position.

Further preferably, the snowmobile includes a platy frame arranged to define a partition between the engine and the brake equipment in the width direction of the snowmobile. In this case, brake dust does not easily reach the space where the engine is, so the arrangement reduces and minimizes brake dust which reaches the throttle motor.

Preferably, the platy frame and the throttle motor overlap each other in a side view. In this case, the arrangement reduces brake dust which reaches the throttle motor from a side of the throttle motor.

Further preferably, the throttle motor and the brake equipment do not overlap each other when viewed from front. In this case, throttle motor and the brake equipment are separated from each other, and the arrangement protects the throttle motor from brake dust.

Further, preferably, the air-intake equipment includes a gear case, and a plurality of gears housed in the gear case. In this case, the gear case covers each of the gears, and reduces brake dust which reaches any of these gears.

Preferably, the gear case includes a bottom portion having a first hole which is open to the atmosphere. In this case, brake dust which has entered the gear case can come out of the case easily.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
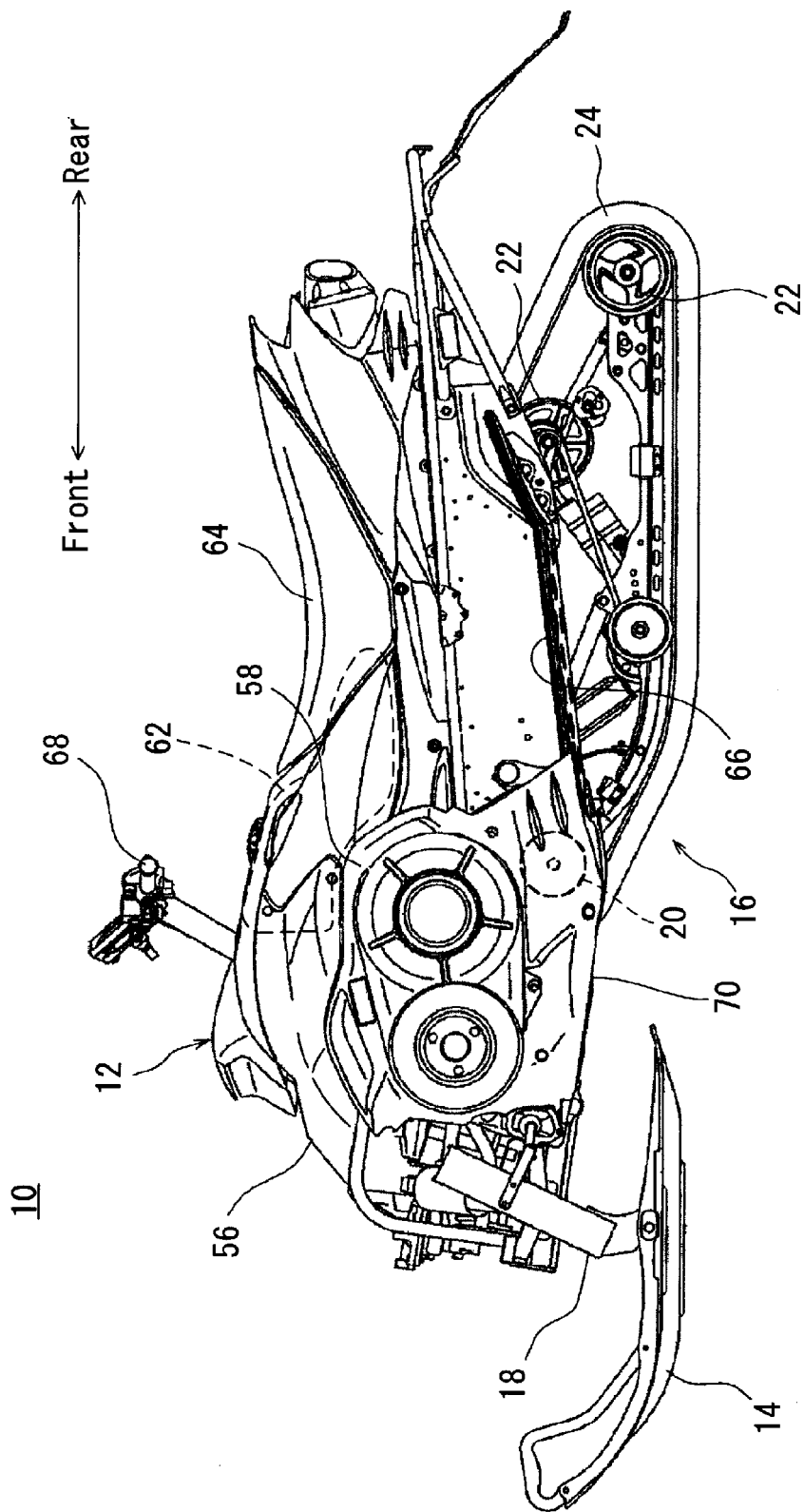
FIG. 1 is a left side view of a snowmobile according to a preferred embodiment of the present invention.
Figure 2:
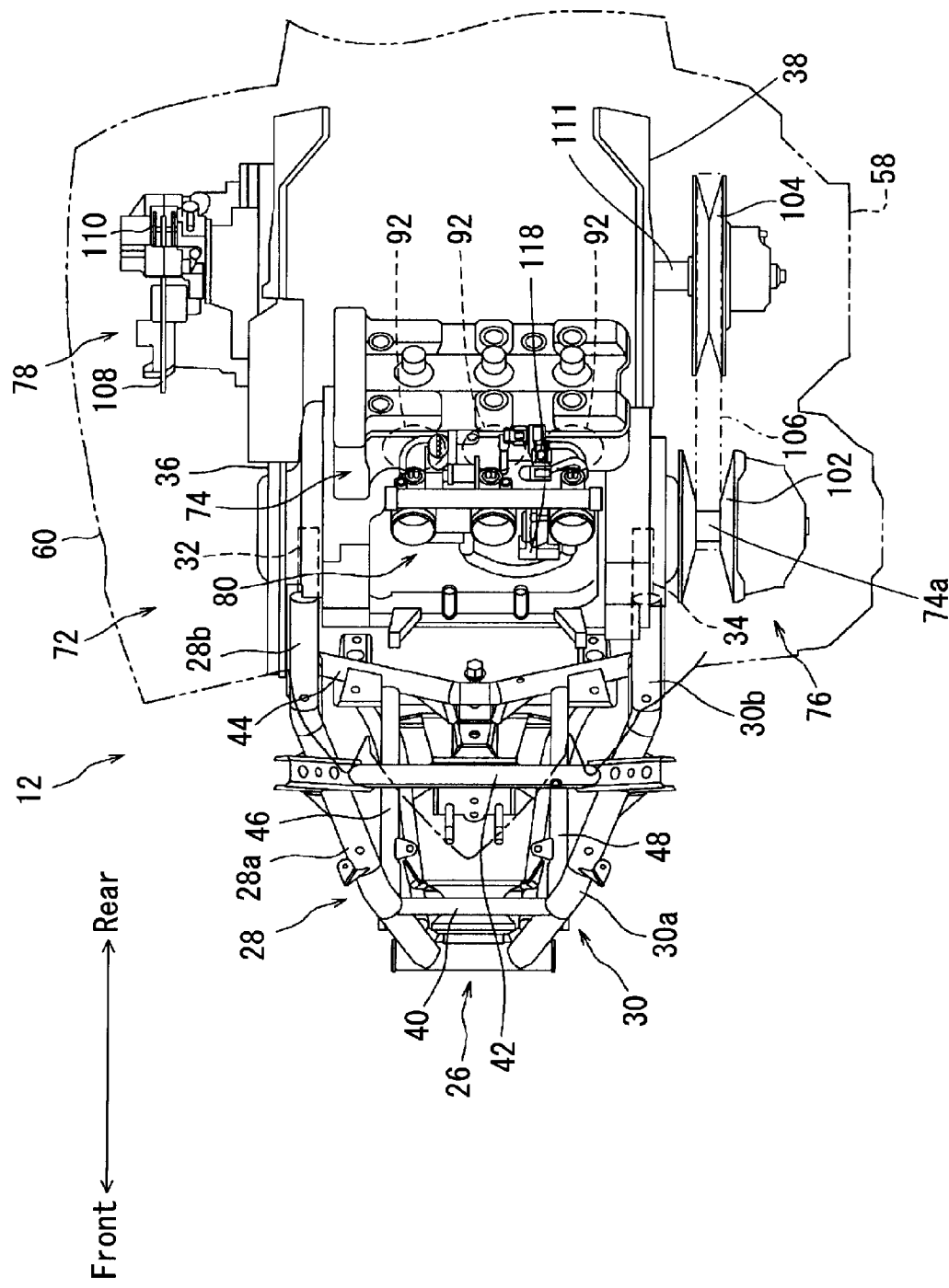
FIG. 2 is a plan view showing a configuration inside of an engine room.
Figure 3:
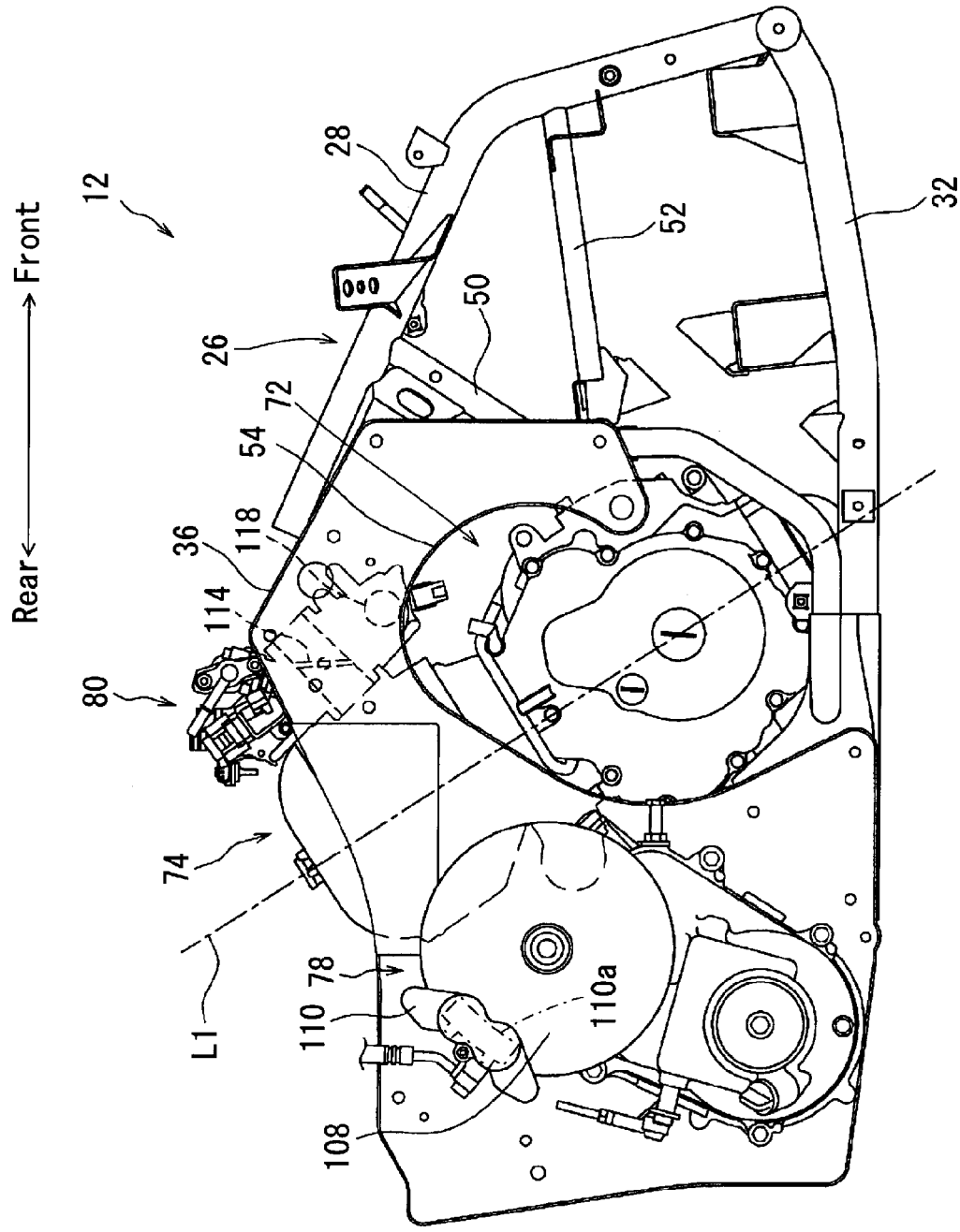
FIG. 3 is a right side view showing the configuration inside of the engine room.

FIG. 1 is a side view of a snowmobile 10 according to a preferred embodiment of the present invention. FIG. 2 is a plan view showing a configuration inside of an engine room 72. FIG. 3 is a right side view showing the configuration inside of the engine room 72.

Referring to FIG. 1, the snowmobile 10 is a saddle-riding type vehicle including a snowmobile body 12, a left-and-right pair of skis 14, and a drive unit 16.

Each of the skis 14 in the pair is supported by a front portion of the snowmobile body 12 via a left and a right suspension mechanisms 18, respectively. Although FIG. 1 shows only the left ski 14 and the left suspension mechanism 18, there is another set of a ski 14 and a suspension mechanism 18 on the right side.

The drive unit 16 is provided below the snowmobile body 12. The drive unit 16 includes, driving wheels 20, driven wheels 22 and a track belt 24. The driving wheels 20 are rotated by driving power supplied from a CVT 76 to be described later. The track belt 24, is wound around the driving wheels 20 and the driven wheels 22 and rotated in a circulatory manner as the driving wheels 20 rotate. The driven wheels 22 are driven with the circulatory rotation of the track belt 24.

Now, the snowmobile body 12 will be described.

The snowmobile body 12 includes a frame 26.

Referring to FIG. 2 and FIG. 3, the frame 26 includes a left-and-right pair of front frame portions 28, 30; a left-and-right pair of bottom frame portions 32, 34; a right side-frame 36; and a left side-frame 38.

The front frame portions 28, 30 and the bottom frame portions 32, 34 are pipe members. As shown in FIG. 2, the front frame portions 28, 30 are disposed at a distance from each other, in the vehicle's width direction. The front frame portions 28, 30 have a bent shape. Namely, the front frame portions 28, 30 have front portions 28a, 30a respectively, which are slanted away from a fore-aft direction so that a distance between the two become smaller at a more forward position in a plan view. The front frame portions 28, 30 have rear portions 28b, 30b respectively, which extend substantially in the fore-aft direction in a plan view. Referring to FIG. 3, in a side view, the front frame portions 28, 30 extend from a front end of the bottom frame portions 32, 34 in an obliquely rearward and upward direction and then bend in a rearward direction in their middle portions.

The bottom frame portions 32, 34 have a bent shape similar to the front frame portions 28, 30 in a plan view. The bottom frame portions 32, 34 have their rear end portions extending beyond those of the front frame portions 28, 30.

The front frame portions 28, 30 and the bottom frame portions 32, 34 are provided with beam portions 40, 42, 44, 46, 48, 50 and 52. Referring to FIG. 2, the beam portions 40 and 42 connect the front portions 28a and 30a with each other. The beam portion 44 connects the rear portions 28b and 30b with each other. The beam portion 46 connects the front portion 28a and the beam portion 44 with each other whereas the beam portion 48 connects the front portion 30a and the beam portion 44 with each other. Referring to FIG. 3, the beam portion 50 connects the front frame portion 28 and the bottom frame portion 32 with each other whereas the beam portion 52 connects the front frame portion 28 and the beam portion 50 with each other. Although FIG. 3 shows only the rightside beam portions 50 and 52, the leftside beam portion 50 connects the front frame portion 30 and the bottom frame portion 34 with each other whereas the lefthand beam portion 52 connects the front frame portion 30 and the left beam portion 50 with each other.

The right side-frame 36 and the left side-frame 38 are platy members each containing a plane which includes the vertical and the fore-aft directions. As shown in FIG. 2, the right side-frame 36 and the left side-frame 38 are disposed at a distance from each other in the vehicle's width direction. The right side-frame 36 provides a partition between an engine 74 and brake equipment 78 to be described later in the vehicle's width direction. As shown in FIG. 3, an upward recessing cutout 54 is provided beneath a front portion of the right side-frame 36. The left side-frame 38 has a shape similar to the right side-frame 36. The left side-frame 38 provides a partition between the engine 74 and the CVT 76 in the vehicle's width direction.

Referring to FIG. 1 and FIG. 2, a front cover 56 is disposed at a front portion of the snowmobile body 12. On both sides of the front cover 56, side covers 58, 60 are disposed. A fuel tank 62 is disposed in an upper portion of the snowmobile body 12. Behind the fuel tank 62, a seat 64 is disposed for the rider to ride on. On the left and right sides below the seat 64, a left and a right footrests 66 are provided at a distance from each other. Although FIG. 1 shows only the left footrest 66, there is another footrest 66 on the right side. A handlebar 68 is provided above a front portion of the snowmobile body 12. A throttle operation member (not illustrated) is provided near a grip of the handlebar 68. In a lower portion of the snowmobile body 12, a bottom plate 70 is disposed. The bottom plate 70 includes a rear portion serving as a ceiling surface of a track house (not illustrated) which houses the track belt 24.

The snowmobile body 12 described thus far includes an engine room 72 therein. The engine room 72 is defined by the front cover 56, the side covers 58, 60, the fuel tank 62 and the bottom plate 70. In a side view, the engine room 72 is between the handlebar 68, the suspension mechanisms 18 and the driving wheel 20.

Figure 4:
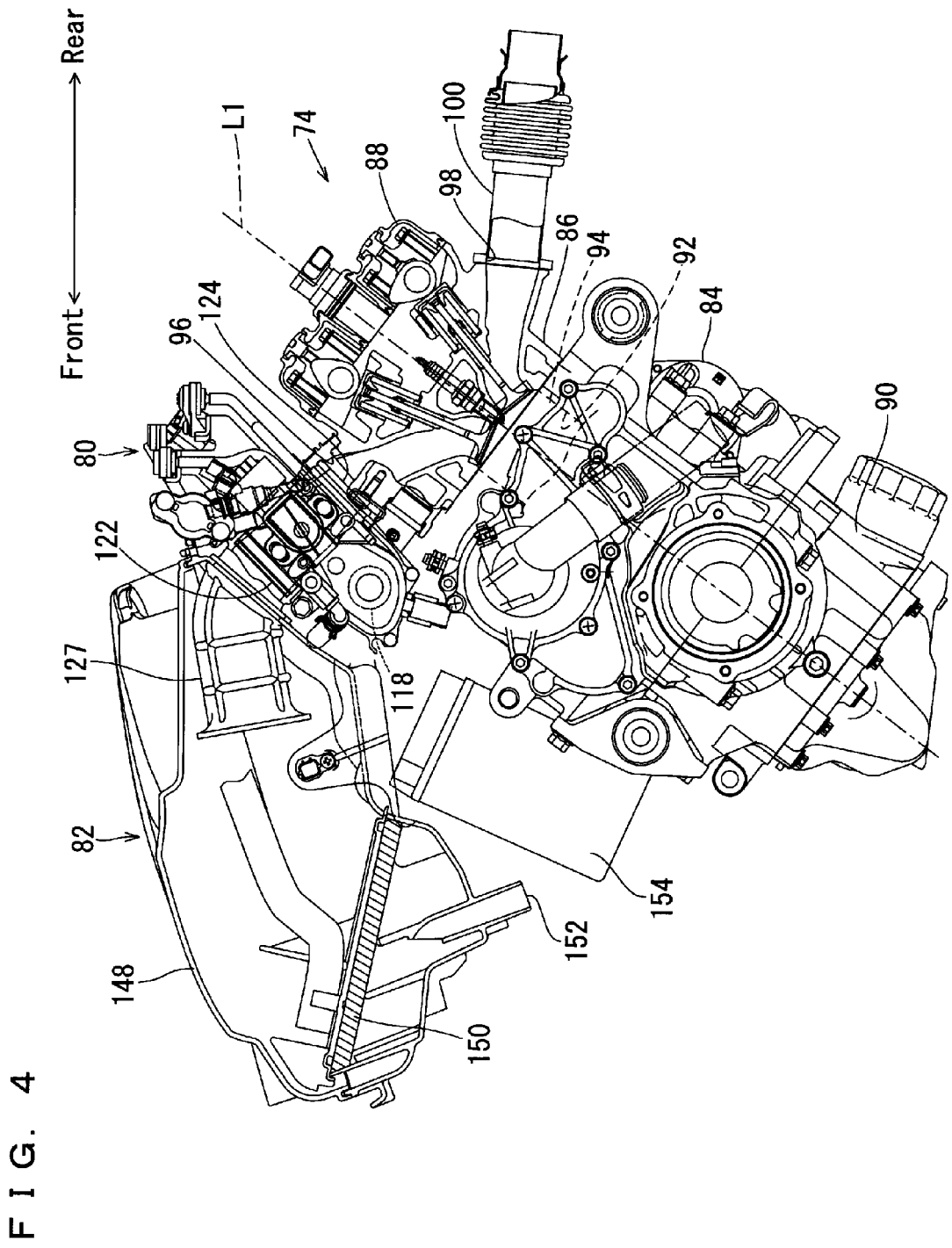
FIG. 4 is an illustrative left side view, showing an engine, air-intake equipment and an air cleaner.

Inside the engine room 72, there are disposed the frame 26, the engine 74, the CVT 76, the brake equipment 78, the air-intake equipment 80 and an air cleaner 82 (see FIG. 4). It should be noted here that for the sake of clarity of the drawings, FIG. 2 and FIG. 3 do not show a portion of a configuration which includes the air cleaner 82.

FIG. 4 is a left side view showing the engine 74, the air-intake equipment 80 and the air cleaner 82.

The engine 74, which preferably is a liquid-cooled, four-cycle, three-cylinder engine, for example, is housed inside the engine room 72. The engine 74 is located between the right side-frame 36 and the left side-frame 38.

Referring to FIG. 4, the engine 74 includes a cylinder block 84, a cylinder head 86, a head cover 88 and a crankcase 90. The cylinder block 84 preferably includes three cylinders 92 disposed side by side in the vehicle's width direction (see FIG. 2). The cylinder head 86 is provided in an upper portion of the cylinder block 84. The head cover 88 is provided in an upper portion of the cylinder head 86. The crankcase 90 is provided at a lower portion of the cylinder block 84. The engine 74 has a slanted cylinder axis L1 so that an upper portion thereof is located at a more rearward position than a lower portion thereof.

Combustion chambers 94 are provided inside the cylinder block 84 and the cylinder head 86. The cylinder head 86 includes a front surface provided with air-intake openings 96, which communicate with the combustion chambers 94. The cylinder head 86 includes a rear surface provided with exhaust openings 98, which communicate with the combustion chambers 94. The exhaust openings 98 are connected with exhaust pipes 100. The exhaust pipes 100 lead to an outlet end at a rear portion of the snowmobile body 12.

The CVT 76 in FIG. 2, which is disposed inside the engine room 72 together with the engine 74, includes a drive pulley 102 and a driven pulley 104. The drive pulley 102 is disposed on the left side of the engine 74, and is connected with a crankshaft 74a of the engine 74. The driven pulley 104 is disposed at a rearward position from the drive pulley 102. The drive pulley 102 and the driven pulley 104 are connected with each other by a belt 106. The drive pulley 102 and the driven pulley 104 are disposed on the outer side of the left side-frame 38.

The brake equipment 78 is disposed inside the engine room 72 together with the engine 74. As shown in FIG. 3, the brake equipment 78 is disposed at a more rearward position than the cylinder axis L1 of the engine 74 in a side view. The brake equipment 78 includes a brake disc 108 and a brake caliper 110. The brake caliper 110 includes brake pads 110a. The brake disc 108 is mounted on the shaft 111, which is connected with the driven pulley 104. When the brake is applied, the brake caliper 110 firmly presses the brake disc 108 from both sides. The brake disc 108 and the brake caliper 110 are disposed on an outer side of the right side-frame 36. It should be noted here that for the sake of clarity of the drawing, FIG. 2 shows only a portion of the shaft 111.

Referring to FIG. 4, the air-intake equipment 80, which supplies air to the combustion chambers 94 via the air-intake openings 96 of the engine 74, is disposed in front of the engine 74.

Figure 5:
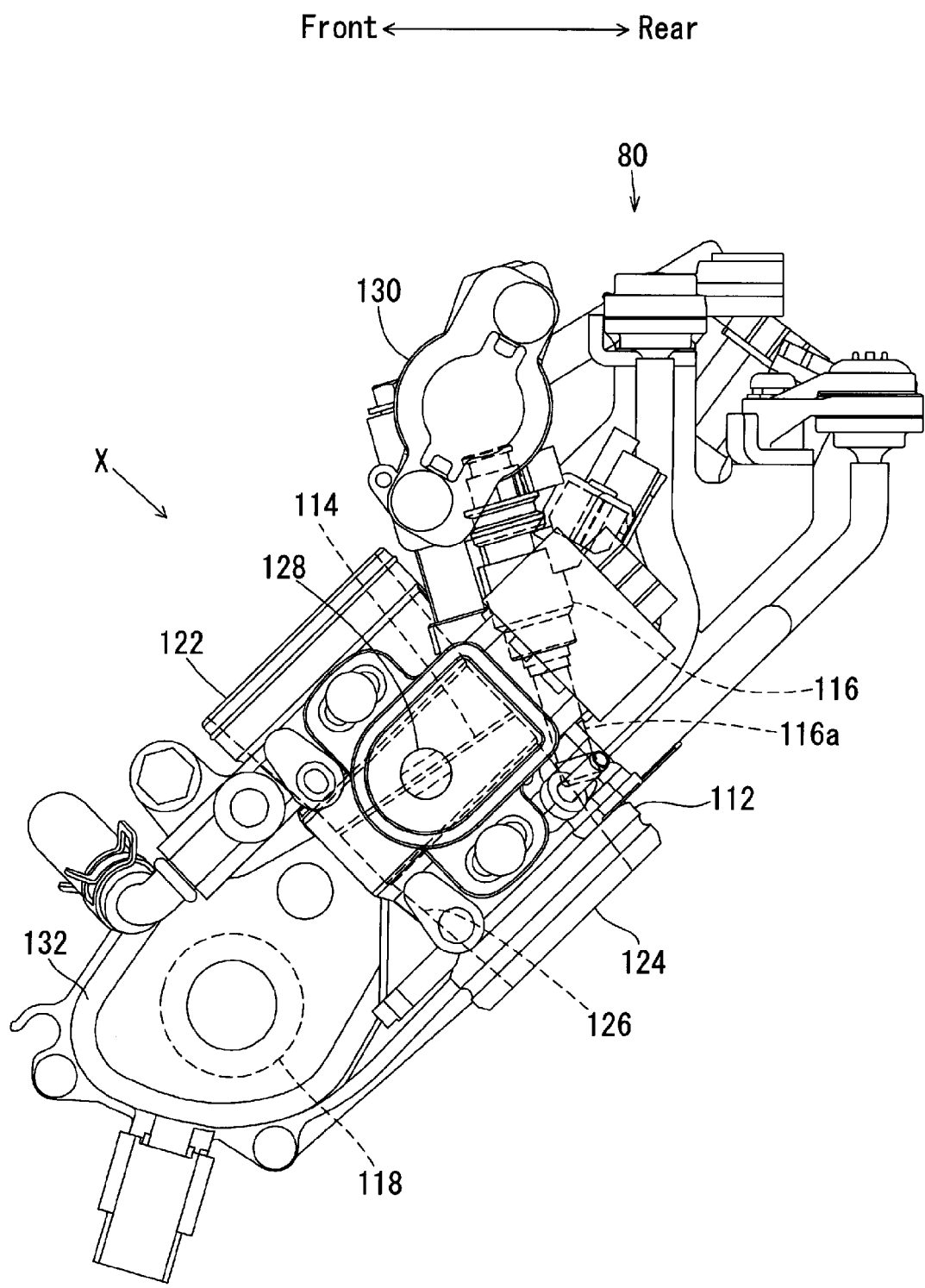
FIG. 5 is an illustrative left side view of the air-intake equipment in FIG. 7.
Figure 6:
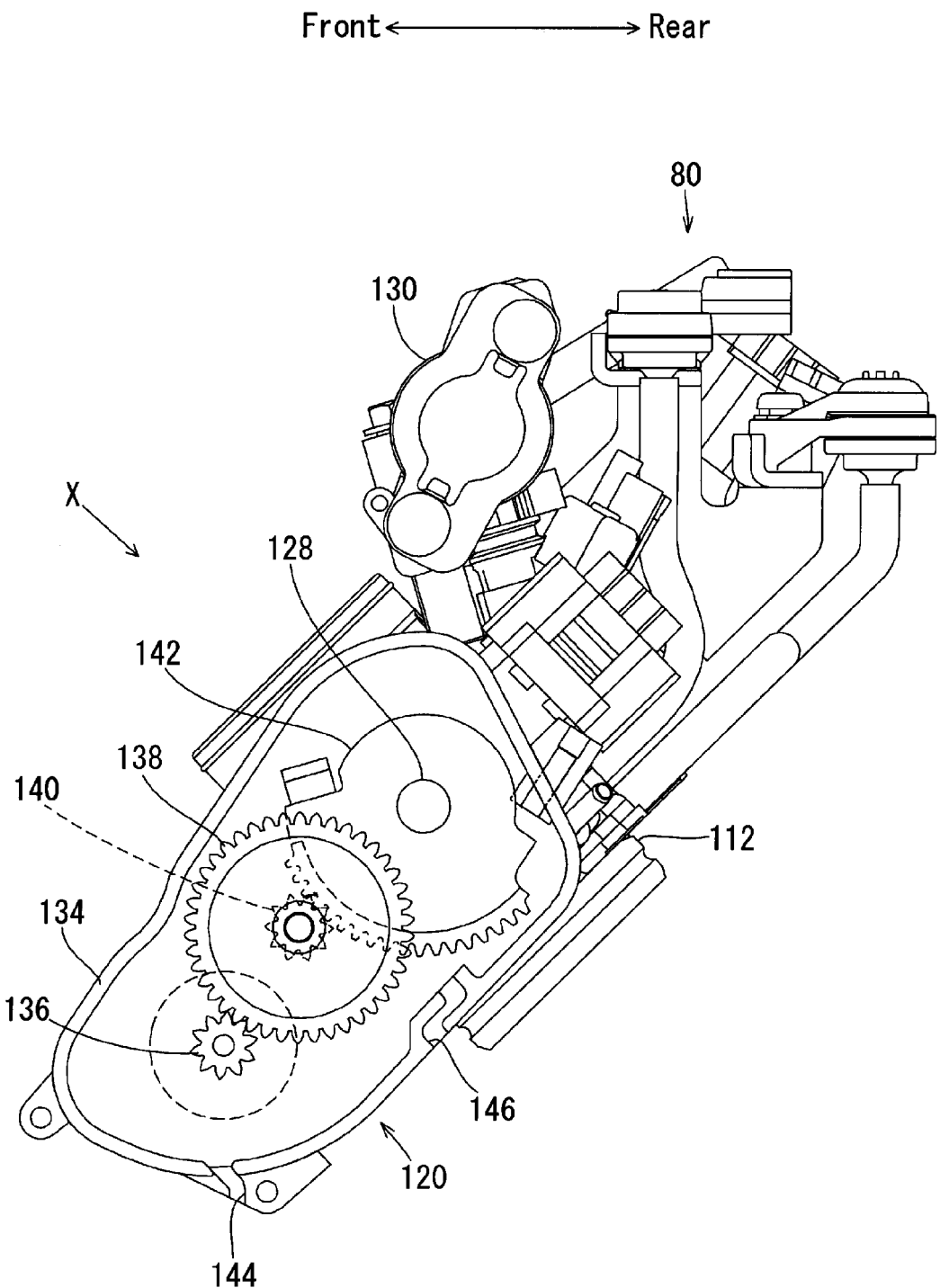
FIG. 6 is an illustrative sectional view taken in lines A-A in FIG. 7.
Figure 7:
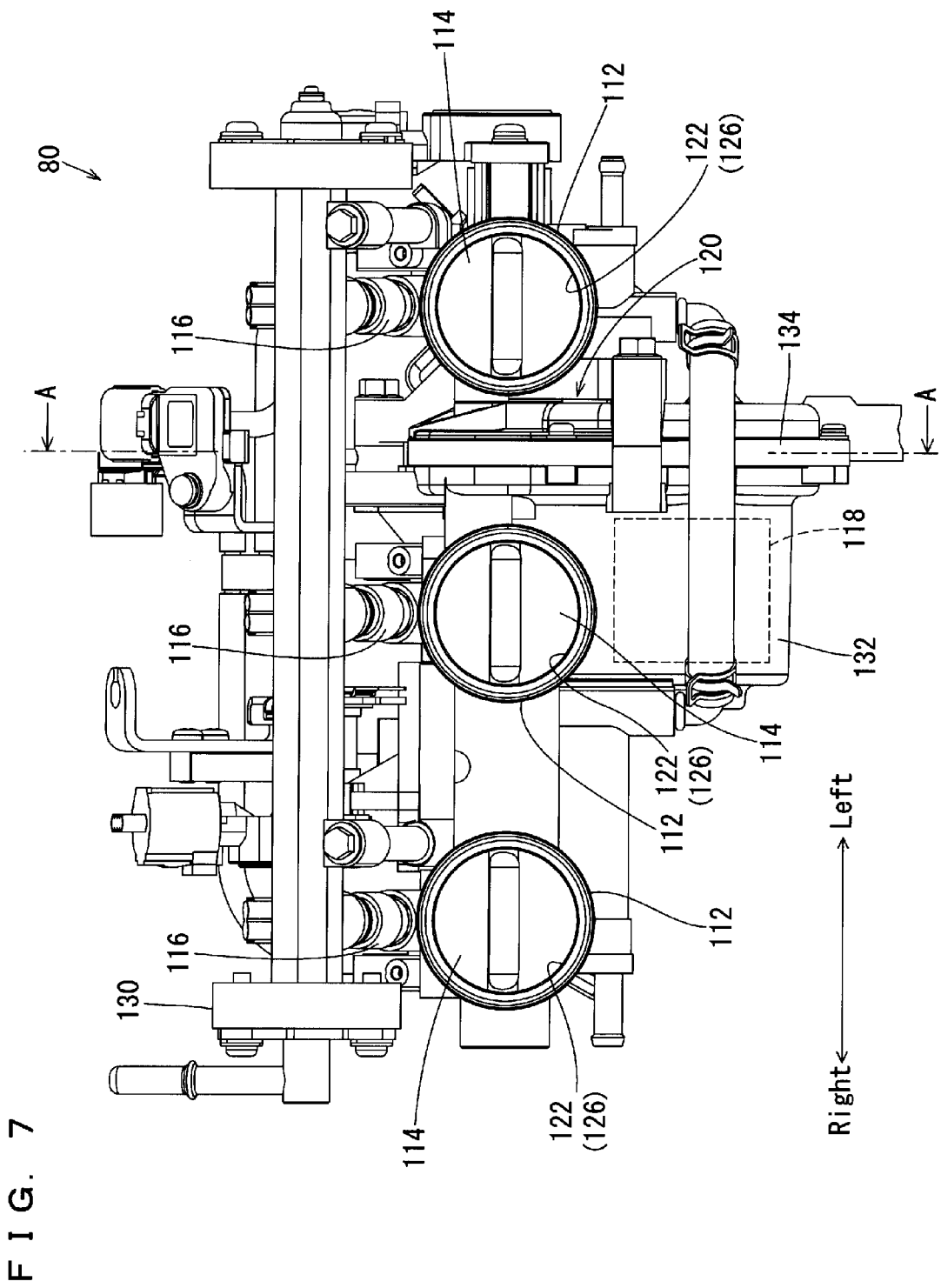
FIG. 7 is an illustrative drawing of the air-intake equipment viewed from a direction duly oriented relative to an air inlet opening.

FIG. 5 is an illustrative left side view of the air-intake equipment in FIG. 7. FIG. 6 is an illustrative sectional view taken in lines A-A in FIG. 7. FIG. 7 is an illustrative drawing of the air-intake equipment 80 viewed from a direction (Direction X in FIG. 5 and FIG. 6) duly oriented relative to its air inlet opening 122 (to be described later).

Referring to FIG. 5 through FIG. 7, the air-intake equipment 80 includes a plurality of throttle bodies 112, a plurality of throttle valves 114, a plurality of fuel injection valves 116, a throttle motor 118 and a reduction gear mechanism 120. The present preferred embodiment uses three throttle bodies 112, three throttle valves 114 and three fuel injection valves 116.

Each throttle body 112 is a tubular member having openings at both ends. Each throttle body 112 includes an air inlet opening 122 at an end; an air outlet opening 124 at the other end; and an air passage 126 therein. The air inlet opening 122 serves as an end of the air passage 126. As shown in FIG. 4, each air inlet opening 122 is connected with an end of an air intake duct 127. The air intake duct 127 includes another end, which is inserted into the common air cleaner 82. The air outlet opening 124 serves as the other end of the air passage 126. The air outlet opening 124 is connected with the air-intake opening 96 of the engine 74. Air from the air-intake opening 96 passes through the air passage 126 and is supplied to the engine 74.

The throttle valve 114 is provided in the air passage 126 inside the throttle body 112. The throttle valve 114, which is variably adjustable between its fully opened position and fully closed position, adjusts the amount of air supplied to the engine 74. Each throttle valve 114 is connected with each other by a common valve shaft 128. The valve shaft 128 includes a spring (not illustrated) which urges the throttle valves 114 toward the fully closed position.

The fuel injection valve 116 is provided above the throttle body 112. The fuel injection valve 116 includes a nozzle 116a arranged to inject fuel. The nozzle 116a has its tip portion inserted into the air passage 126 in the throttle body 112. Each fuel injection valve 116 is connected with a common fuel supply pipe 130. The fuel supply pipe 130 is connected with a fuel pump (not illustrated). The fuel pump supplies the fuel to each of the fuel injection valves 116 via the fuel supply pipe 130.

The throttle motor 118 is housed in the motor casing 132, and opens and closes the throttle valve 114. The throttle motor 118 is provided below the throttle body 112. Specifically, the throttle motor 118 is disposed on a side away from the fuel injection valves 116 as viewed from the throttle body 112. Referring to FIG. 3 and FIG. 4, the throttle motor 118 is disposed to face the front surface of the engine 74, within a dimension of the engine 74 taken in the vehicle's width direction. Therefore, the throttle motor 118 is located at a more forward position than the brake equipment 78, with the engine 74 disposed in between. In a side view, the throttle motor 118 is located at a more forward position than the cylinder axis L1 of the engine 74. Also, the throttle motor 118 is disposed at a higher position than the brake pads 110a of the brake equipment 78, so as to overlap the right side-frame 36 in a side view. The throttle motor 118 and the brake equipment 78 do not overlap each other when viewed from front. Further, at least a portion of the throttle motor 118 is located at a higher position than the brake equipment 78. It should be noted here that the snowmobile 10 includes an unillustrated controller, which is arranged and programmed to control the throttle motor 118 based on operations made to the earlier-mentioned throttle operation member. Specifically, so called electronic throttle control is performed.

Referring to FIG. 6, the reduction gear mechanism 120 includes a gear case 134, and gears 136, 138, 140 and 142. The gear case 134 is provided next to a motor casing 132 in the vehicle's width direction. The gears 136 through 142 are preferably made of resin, for example, housed in the gear case 134, and transmit driving power from the throttle motor 118 to the valve shaft 128. The gear case 134 includes a first hole 144 which is open to the atmosphere in its bottom portion, and a second hole 146 which is open to the atmosphere and is arranged at a higher position than the first hole 144. The first hole 144 extends in a generally V shape. The second hole 146 extends in a generally Z shape.

Returning to FIG. 4, the air cleaner 82 includes an air box 148 and an air filter 150. The air box 148 is preferably made of resin, for example, and is disposed ahead of the engine 74, and more particularly ahead of the cylinder head 86. The air box 148 is disposed so as to cover a space in front of the throttle motor 118. In other words, a portion of the air box 148 is ahead of the throttle motor 118. Therefore, the throttle motor 118 is located between a rear surface region of the air box 148 and a front surface region of the engine 74 in a side view.

Also, the air intake duct 127, which is connected with the throttle bodies 112, is inserted into a rear portion of the air box 148. The air box 148 includes a front bottom portion having an air-intake inlet 152. The air filter 150 is provided inside the air box 148, and cleans air which passes through the air box 148. The air comes in from the air-intake inlet 152 of the air box 148, into the air box 148, passes through the air filter 150 and the air intake duct 127, and then enters the air-intake equipment 80.

A battery 154 is disposed in front of the engine 74. The battery 154 is below the air cleaner 82. The battery 154 is in proximity to the throttle motor 118, and is opposed to the throttle motor 118.

According to the snowmobile 10 as described thus far, the throttle motor 118 is disposed at a more forward position than the engine 74 and the brake equipment 78, inside the engine room 72. The throttle motor 118 is located more upstream of wind than the brake equipment 78. Therefore, as the vehicle moves, the wind reduces brake dust of the brake equipment 78 which reaches the throttle motor 118, and thus the arrangement protects the throttle motor 118 from the brake dust and prevents contamination by the brake dust.

Since the air-intake equipment 80 which includes the throttle motor 118 is disposed ahead of the engine 74, the arrangement also protects other components of the air-intake equipment 80 from the brake dust.

In a side view, the throttle motor 118 is at a more forward position than the cylinder axis L1 of the engine 74, and the brake equipment 78 is at a more rearward position than the cylinder axis L1. Therefore, the throttle motor 118 and the brake equipment 78 are separated from each other by the engine 74. This reduces and minimizes brake dust which reaches the throttle motor 118.

Since the engine 74 includes a plurality of cylinders 92 disposed side by side in the vehicle's width direction, the engine 74 has a relatively large dimension in the vehicle's width direction. This reduces and minimizes brake dust which flies around the engine 74 and reaches the throttle motor 118 from the vehicle's width direction.

At least a portion of the throttle motor 118 is located at a higher position than the brake equipment 78. Therefore, gravity reduces and minimizes brake dust which reaches the throttle motor 118.

The cylinder axis L1 is slanted so that an upper portion of the cylinder is located at a more rearward position than a lower portion. Thus, the throttle motor 118 disposed ahead of the engine 74 is in an upper region with respect to the cylinder axis L1 as a division line. The arrangement therefore makes it easy to place the throttle motor 118 at a relatively high position.

The right side-frame 36 provides a partition between the engine 74 and the brake equipment 78 in the vehicle's width direction. Therefore, brake dust does not easily reach the space where the engine 74 is. The arrangement reduces and minimizes brake dust which reaches the throttle motor 118.

The right side-frame 36 and the throttle motor 118 overlap each other in a side view. The arrangement reduces and minimizes the brake dust which reaches the throttle motor 118 from a side of the throttle motor 118.

The throttle motor 118 and the brake equipment 78 do not overlap each other when viewed from the front. Therefore, the throttle motor 118 and the brake equipment 78 are separated from each other, and the arrangement protects the throttle motor 118 from brake dust.

Brake dust contains metal powder which is produced inevitably as the brake disc 108 and the brake pads 110a wear. If the brake dust reaches the gears 136 through 142, it will set between gear teeth, and accelerates gear wear. Resin gears are more susceptible to this accelerated wearing caused by the brake dust which contains metal power. However, the snowmobile 10 includes the air-intake equipment 80 which includes the gear case 134 that includes the gears 136 through 142. Since the gear case 134 covers each of the gears 136 through 142, the arrangement reduces and minimizes brake dust which reaches any of the gears 136 through 142.

Since the gear case 134 includes the first hole 144 which is open to the atmosphere in its bottom portion, brake dust which has reached inside the gear case 134 can be flown out of the case easily.

The gear case 134 further includes the second hole 146 which is arranged at a higher location than the first hole 144. The second hole 146 formed as described facilitates discharge of liquid such as water, in addition to brake dust, from inside the gear case 134.

It should be noted here that the cylinder axis L1 may be slanted so that a lower side is located more rearward than a upper side. In this case again, the engine 74 separates the brake equipment 78 and the throttle motor 118 from each other, so the arrangement can protect the throttle motor 118 from brake dust.

The present preferred embodiment of the present invention requires that at least the throttle motor 118 in the air-intake equipment 80 is located at a forward position of the engine 74. This protects the throttle motor 118 from brake dust.

In the preferred embodiment described above, the engine 74 preferably is of a front-intake rear-exhaust type. However, the engine is not limited to this. The engine may be of a front-exhaust rear-intake type or other suitable type.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snowmobile comprising:
    a snowmobile body including an engine room therein;
    an engine disposed inside the engine room;
    brake equipment disposed inside the engine room;
    a throttle valve arranged to adjust intake air supplied to the engine; and
    air-intake equipment including a throttle motor disposed inside the engine room and arranged to drive the throttle valve and a throttle body arranged to house the throttle valve; wherein
    at least a portion of the throttle motor is disposed at a higher position than the brake equipment; and
    the air-intake equipment further includes a gear case, and a plurality of gears housed in the gear case.

2. The snowmobile according to claim 1, wherein the engine includes a plurality of cylinders disposed side-by-side in a width direction of the snowmobile.

3. The snowmobile according to claim 1, wherein the throttle motor and the brake equipment do not overlap each other when viewed from a front of the snowmobile.

4. The snowmobile according to claim 1, wherein the gear case includes a bottom portion including a first hole open to the atmosphere.

5. The snowmobile according to claim 1, further comprising the brake equipment including a brake disc and a brake caliper; wherein
    at least a portion of the throttle motor is disposed at a higher position than the brake caliper.

6. The snowmobile according to claim 5, further comprising the brake caliper includes brake pads; wherein
    at least a portion of the throttle motor is disposed at a higher position than the brake pads.

7. A snowmobile comprising:
    a snowmobile body including an engine room therein;
    an engine disposed inside the engine room;
    brake equipment disposed inside the engine room;
    a throttle valve arranged to adjust intake air supplied to the engine; and
    a throttle motor disposed inside the engine room and arranged to drive the throttle valve; and
    a fuel injection valve; wherein
    at least a portion of the throttle motor is disposed at a higher position than the brake equipment; and the throttle motor is disposed on a side away from the fuel injection valve as viewed from the throttle body.

8. A snowmobile comprising:
a snowmobile body including an engine room therein;
an engine disposed inside the engine room;
brake equipment disposed inside the engine room;
a throttle valve arranged to adjust intake air supplied to the engine; and
a throttle motor disposed inside the engine room and arranged to drive the throttle valve; wherein
at least a portion of the throttle motor is disposed at a higher position than the brake equipment; and
the brake equipment is at a more rearward position than a cylinder axis of the engine in a side view of the snowmobile, and the throttle motor is at a more forward position than the cylinder axis in a side view of the snowmobile.

9. A snowmobile comprising:
a snowmobile body including an engine room therein;
an engine disposed inside the engine room;
brake equipment disposed inside the engine room;
a throttle valve arranged to adjust intake air supplied to the engine; and
a throttle motor disposed inside the engine room and arranged to drive the throttle valve; and
a platy frame extending in a vertical direction and a fore-aft direction of the snowmobile; wherein
at least a portion of the throttle motor is disposed at a higher position than the brake equipment; and
the platy frame is arranged to define a partition between the engine and the brake equipment in a width direction of the snowmobile.

10. A snowmobile comprising:
a snowmobile body including an engine room therein;
an engine disposed inside the engine room;
brake equipment disposed inside the engine room;
a throttle valve arranged to adjust intake air supplied to the engine; and
a throttle motor disposed inside the engine room and arranged to drive the throttle valve; wherein
at least a portion of the throttle motor is disposed at a higher position than the brake equipment; and
the throttle motor is within a dimension of the engine taken in a width direction of the snowmobile.

* * * * *